Aug. 13, 1957  J. PRENDERGAST ET AL  2,802,563
SAFETY DEVICE FOR RUG DRYING CONVEYOR APPARATUS
Filed Jan. 13, 1956  3 Sheets-Sheet 1

INVENTORS.
JOHN PRENDERGAST
RALPH R. WINNER
BY
Hyde, Meyer, Baldwin & Doran
ATTORNEYS

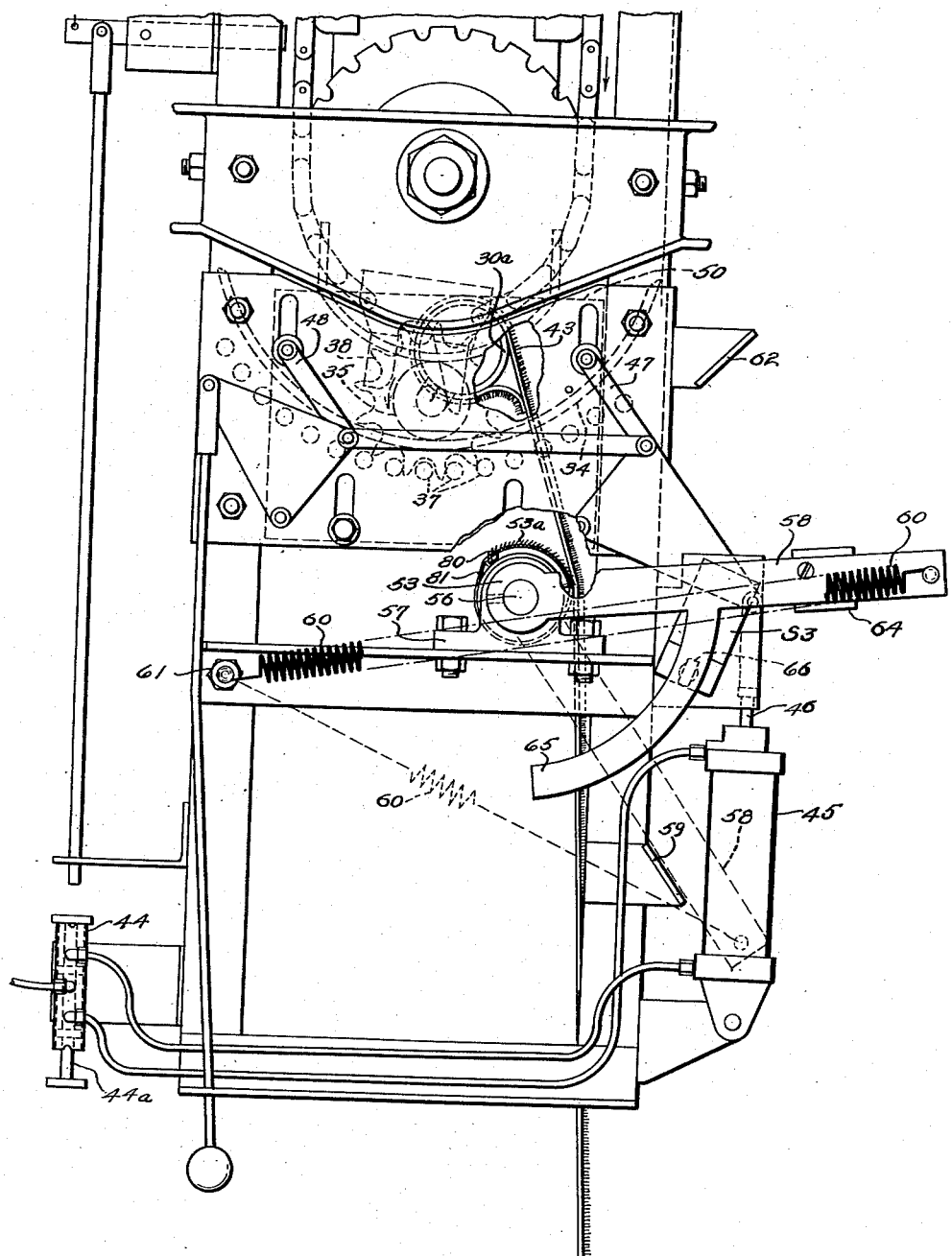

Aug. 13, 1957  J. PRENDERGAST ET AL  2,802,563
SAFETY DEVICE FOR RUG DRYING CONVEYOR APPARATUS
Filed Jan. 13, 1956  3 Sheets-Sheet 3
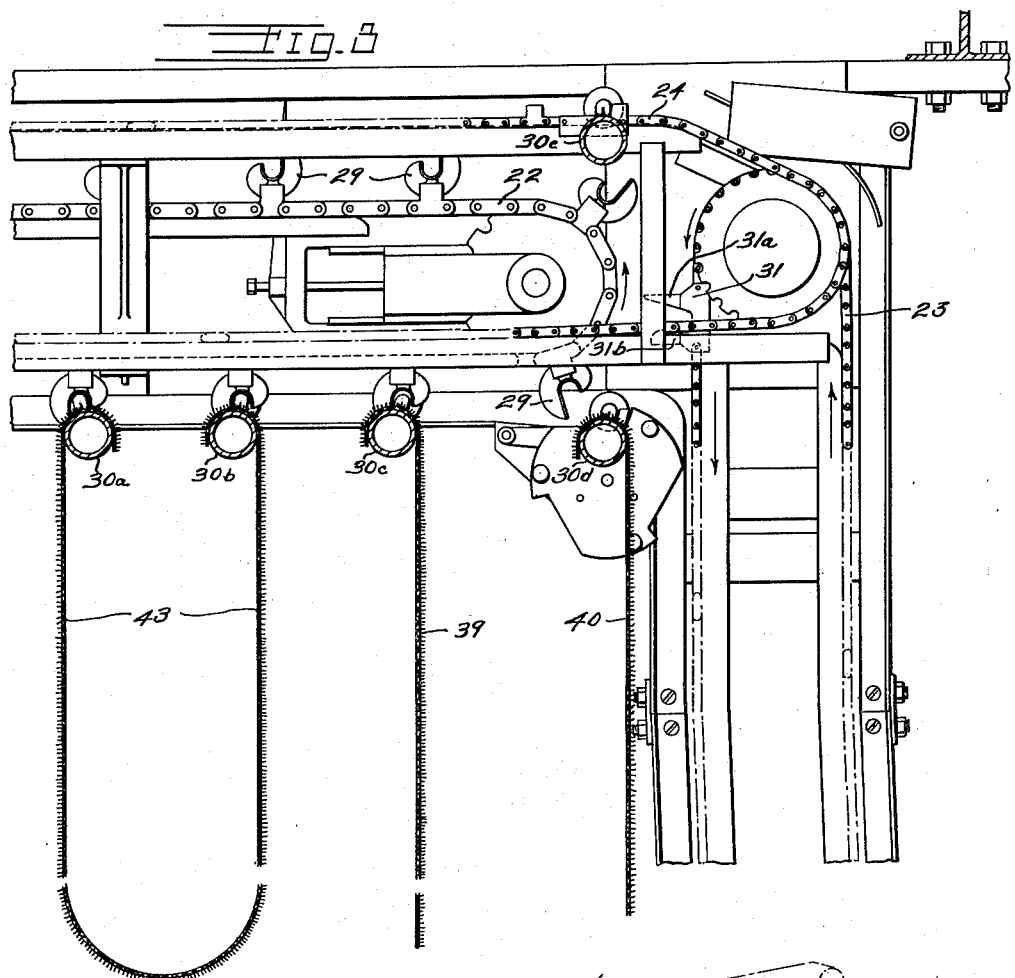
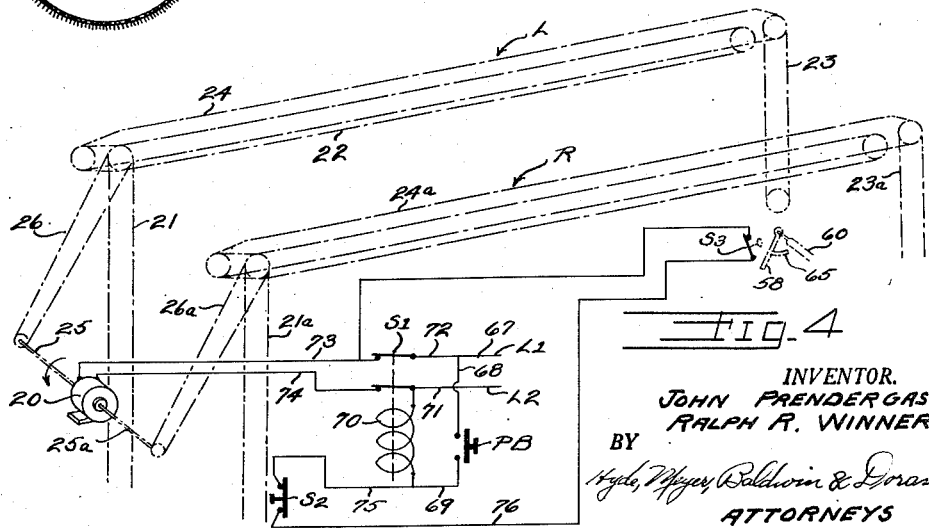
INVENTOR.
JOHN PRENDERGAST
RALPH R. WINNER
BY
Hyde, Meyer, Baldwin & Doran
ATTORNEYS United States Patent Office 2,802,563
Patented Aug. 13, 1957

2,802,563

SAFETY DEVICE FOR RUG DRYING CONVEYOR APPARATUS

John Prendergast, Mount Healthy, and Ralph R. Winner, Cincinnati, Ohio, assignors to The American Laundry Machinery Company, Cincinnati, Ohio, a corporation of Ohio Application January 13, 1956, Serial No. 559,052

17 Claims. (Cl. 198—232)

The invention relates to a safety device for the rug-release mechanism of a rug conveyor in a rug drying room, and is an improvement on the mechanism shown in a co-pending application of Wayne E. Myers, Serial No. 509,714, filed May 20, 1955 for Rug Conveyor for Dry Room.

In the conveyor disclosed in said co-pending application, a continuous series of rugs are suspended from respective rug-carrying poles on a generally vertical, ascending loading conveyor, automatically transferred from the top of the loading conveyor to a generally horizontal drying conveyor whereby the poles are carried away from said loading conveyor at a relatively slow speed, and eventually automatically transferred from said drying conveyor to the top end of a descending, generally vertical unloading conveyor at the lower end of which the now dried rugs are detached from the poles.

The present invention has for its object the provision of safety devices whereby the rug is automatically stripped from the rug-carrying pole on said unloading conveyor at a predetermined unloading point.

Another object of the invention is the provision of means whereby the conveyor motor is stopped if the rug is not stripped from the rug-carrying pole as planned. The purpose of this feature is to prevent damage to the rug and/or to the conveyor or the rug stripping means if the rug is not properly stripped as aforesaid.

Other objects and advantages will be apparent from a study of the following specification in conjunction with the accompanying drawings in which Fig. 1 is a view of the lower, inside, left-end of the unloading conveyor equipped with our safety device.

Fig. 2 is a view, somewhat enlarged, of the same end of the same conveyor, but as seen from the outside, so that Figs. 1 and 2 are reversed, left-and-right, with respect to each other. This is mentioned to avoid later confusion in studying movements of movable elements.

Fig. 3 is an inside view showing the upper end of the left side vertical unloading conveyor at its zone of junction with the left side horizontal drying conveyor.

Fig. 4 is a diagrammatic view indicating the several conveyors, the drive motor, and the electrical circuits and controls therefor.

Figure 1:
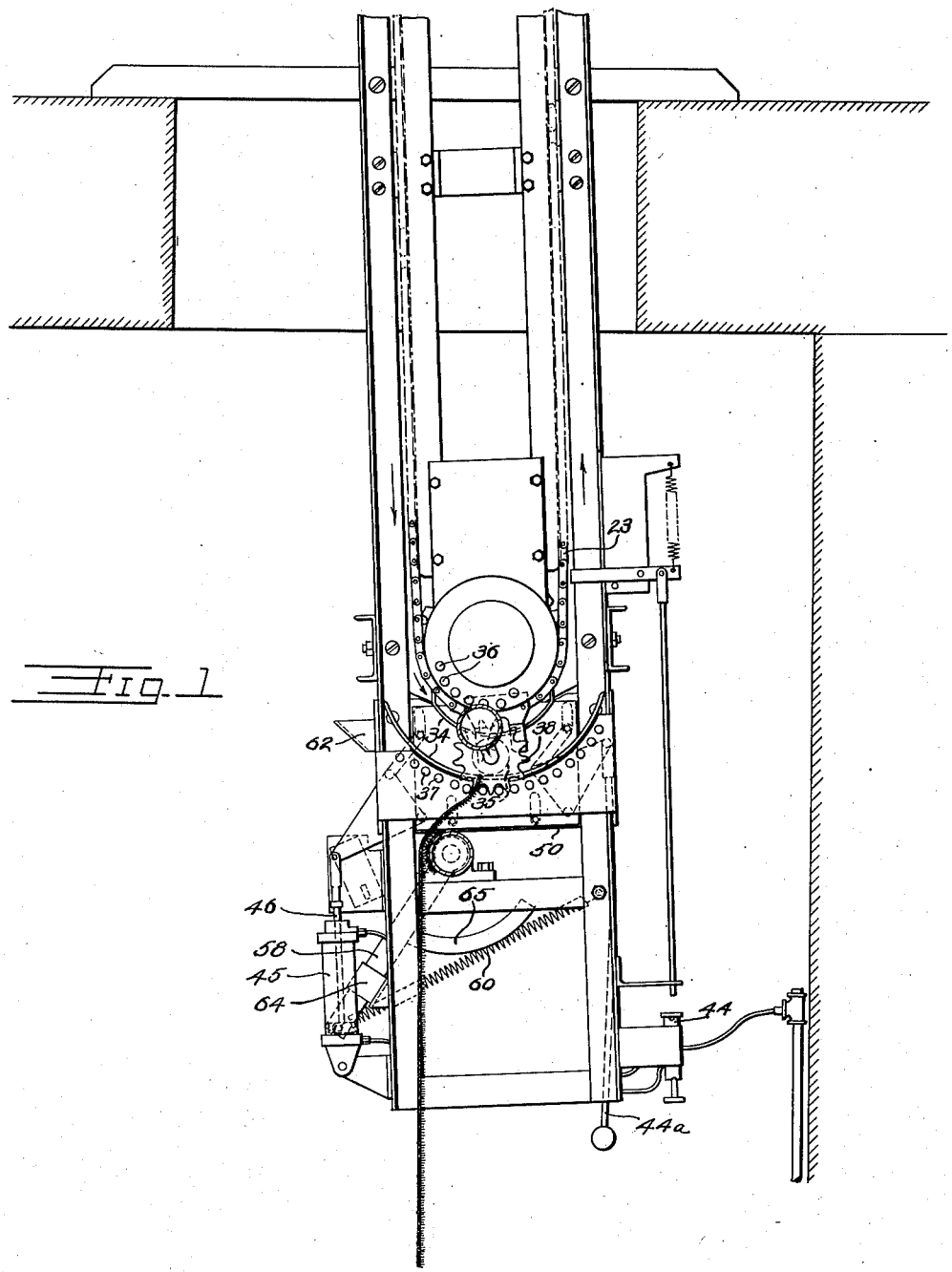

The complete structure and operation of the rug-drying apparatus, here shown only schematically in Fig. 4, is fully shown and described in the aforesaid Myers application, Serial No. 509,714, but it will be very briefly characterized here, still referring to Fig. 4, and corresponding parts in the other drawings.

The apparatus comprises a right frame R and left frame L, extending in upright, parallel, spaced relationship away from a power source here indicated as a driving motor 20. The frames have loading conveyors 21, 21a standing substantially vertically near the motor, drying conveyors 22, 22a extending horizontally away from the motor, and vertical delivery conveyors 23, 23a at the opposite end of the room from the motor. For convenience in Fig. 4 the frames are shown, in outline and in perspective fashion, as vertically and laterally offset from each other, but actually corresponding parts of each side frame are in the same horizontal and vertical planes, as though the frames were opposite side walls of a room.

Each rug-carrying pole has, at each end, means for supporting and conveying it on the opposed right and left conveyors, including a wheel at each end which usually rolls in contact with its conveyor frame, and each conveyor has impeller or carrier means to move the pole. A fourth pair of conveyors, 24 and 24a, is used to return empty poles to the loading end, but is not of interest here. The single motor 20, through its lineally extended shafts 25 and 25a, drives belts 26 and 26a, and, through interconnection between the successive conveyor elements, drives all conveyors in both side frames. Stoppage of motor 20 consequently stops all conveyors. The present invention is directed towards means for stopping motor 20 if a dried rug is not properly stripped from its rug-carrying pole when said pole reaches the lower end of delivery conveyors 23, 23a.

Referring briefly to Fig. 3, we show the upper left corner of the conveyor assembly wherein the horizontal link chain 22 is provided with lugs 29 each having a finger which, on the lower flight of the chain, depend behind laterally projecting extensions from rug-carrying poles 30a, 30b, 30c, 30d. In a transfer zone at the point of juncture of the horizontal conveyor 22 and the vertical unloading conveyor 23 the pole axle is transferred into a recess between fingers 31a and 31b of a lug 31 carried on conveyor 23, and the pole is thereby lowered on conveyor 23 to the unloading zone. This operation, as well as the various moving elements here only briefly characterized, are more fully described in the aforesaid co-pending Myers application.

It will be understood that after the dried rug is dropped from the unloading conveyor, the empty pole is carried upwardly on the outside stretch of the conveyor (right side of Figs. 1 and 3 and left side of Fig. 2) and returned along the top flight of the pole return conveyor 24 to the loading zone. In Fig. 3 an empty pole 30e is shown on its return trip on the return conveyor 24.

Referring now to Figs. 1 and 2, which show the lower end of the unloading conveyor from respectively the inside and outside of the drying assembly, an arcuate track member 34 forms part of the lower end of the conveyor and affords a path for a wheel 35 which is rotatably mounted on the outer end of the pole axle. Adjacent the track are an upper and lower series of spaced pins, 36 and 37 respectively, which are disposed to cooperate with the teeth of a sprocket wheel 38 attached near the end of the pole. The track 34 is shiftable vertically by the operator, the situation being such that if the track is in the down position of Fig. 1, the sprocket teeth will mesh with the lower row of pins and cause the sprocket to rotate clockwise, producing corresponding rotation of the pole, while if the track is moved upwardly, the sprocket teeth will mesh with the upper row of pins and rotate the sprocket and pole counterclockwise.

Referring to Fig. 3, it may be noted that rugs 39 and 40 are looped counterclockwise around their respective poles, being retained by a row of pins protruding from the periphery of the pole. These pins protruding from the pole are slightly inclined in one direction because the pole is tipped due to the off-center weight suspended therefrom, so that the suspended rug retains its position, but it will be apparent that if the poles 30c and 30d are rotated clockwise (Fig. 3), a fractional increment of 360°, the rugs 39 and 40 will fall by gravity from their respective poles. The purpose of a controlled direction of rotation of a pole in the unloading zone will now be clear, because the operator must take care that the track-shifting mechanism is properly set to rotate the pole in rug-stripping direction, depending on the direction in which the rug edge is looped.

It might be assumed that this would present no problem since all rugs might be attached in the same direction, and no track shifting device would be needed. As a matter of practical convenience, this is not the case.

A special problem is presented, for example, in the drying of a strip of rug of extended length. There is a practical limit to the height of a drying room, and the clearance between the horizontal drying conveyor and the floor is arranged to take rugs up to a certain, usually encountered, maximum length, without dragging the rug on the floor. A strip of rug such as indicated at 43 (Fig. 3) is too long for single pole suspension, and the problem is solved by looping both ends of the rug around adjoining poles. A moment's thought will make it clear that this is most conveniently done, as shown, by looping the ends in opposite directions. Further thought will also make it clear that the successive poles 30b, 30a must be rotated in opposite directions at the unloading zone to successfully strip the rug ends.

Another factor influencing the direction of looping of the rug end around a pole is the position of the attendant when he picks up the rug end to attach it. The rugs are scrubbed face up and if the scrubbing is done under the conveyor, usually termed "inside," the rug will be placed, back down, over the pole in the manner of rugs 39 and 40 of Fig. 3, and the end of rug 43 which is looped over pole 30b. If the scrubbing is done outside the conveyor frame, the rugs will likewise be placed back down, but looped in the opposite direction, as seen in the rug end on pole 30a of Fig. 3.

For these and other reasons, therefore, the control embodied in the arcuate track has been provided for ready reversal of direction by the operator who stands by and watches the stripping procedure. The track is shifted by operating valve 44 which admits air to cylinder 45. A piston rod 46 operates the associated toggles 47, 48, and they in turn raise or lower a plate 50 which carries the track.

The Myers co-pending application hereinbefore referred to, discloses the use of a fixed stripper bar just below the arcuate track, and here shown at 53. This stripper bar is provided with a strip of carding cloth, the pins of which are inclined downwardly in such way as to intercept and hold a rug which makes contact therewith as its pole enters the arcuate track. The pole is normally rotating in such way that gravity would be calculated to strip the rug in any event, but the additional holding tendency of the carding strip on the stripper bar assures removal of the rug from the rug-carrying bar, and the downward inclination of the pins on the stripper bar then permits the rug to fall to the delivery position.

In the arrangement disclosed in the drawings, the rugs are scrubbed under the conveyor, the normal looping on the conveyor pole being as indicated by rugs 39 and 40, Fig. 3, with the back of the rug in contact with the carrier pole. For stripping poles looped in this way, the arcuate track is normally down so as to permit engagement of the sprocket teeth with the lower set of track pins. Referring to Fig. 1 in which the track is in this normal position, and the sprocket wheel is rotating clockwise in contact with the lower set of pins, the rug peels from the pole, assisted by the intervention of the stripper bar 53. Referring now to Figs. 2 and 3, it will be seen that the trailing end of the long strip 43 is reversely looped around pole 30a, and when pole 30a arrives at the arcuate track (Fig. 2) if the sprocket were still in contact with the lower set of pins, the track being still down, the rug would be wound around pole 30a, this being well shown in Fig. 2, and serious damage either to the rug or to a machine element would result because the carding cloth on the stripper bar will tightly engage the hanging portion of the rug.

This somewhat extended explanation of the operation of the prior art stripping device has been necessary to provide a proper background for an understanding of the present invention. The purpose of the present invention is to utilize the gripping action on the rug between the carrying pole and the stripper bar to move a control member and actuate a switch when tension greater than the normal stripping force is applied to the stripper bar.

As hereinabove explained, the stripper bar shown in the co-pending Myers application was fixed. In the present instance, stripper bar 53 is rotatably mounted, a gudgeon or short shaft 56 being secured to each end of the bar and being journalled in a bearing 57 in the frame. At one end (the end shown in the present drawings) the shaft extends outwardly, and has secured thereto a lever 58. Normally this lever is held in its lowest position against a stop bracket 59 by a tension spring 60 which is attached to the outer end of the lever and to a projecting stud 61 on the frame. This position is shown in full line in Fig. 1 and being indicated in broken line in Fig. 2. A rubber block 64 is fastened to the lever, for shock-resistant stopping against either the lower stop 59 or an upper stop 62 also attached to the frame. Examination of Fig. 2 will show that the pivoted lever 58 and the tension spring 60 constitute an overcenter snap mounting.

Lever 58 has a downwardly extending curved segment or leg 65, the function of which is to operatively contact the roller finger 66 of a switch $S_3$ when the lever is in a position intermediate the stops 59 and 62. As will appear, this breaks the power circuit to motor 20 when conditions are encountered which result in upward swing of lever 58.

We now describe an actual operation wherein an operator failed to move arcuate track 34 under such circumstances that the track should have been moved. In the following description reference must also be had to the diagrammatic showing of Fig. 4.

Assume that all conveyors are running, motor 20 being energized as follows: The operator closes switch PB, and current flows from line $L_1$ through conductors 67 and 68, push button switch PB, conductor 69, solenoid coil 70, and conductor 71 to $L_2$. Energization of coil 70 closes line switch $S_1$, setting up a motor circuit as follows: from $L_1$ through conductors 67 and 72, switch $S_1$, conductor 73, motor 20, conductor 74, switch $S_1$, and conductor 71 to $L_2$.

Closure of switch $S_1$ sets up a maintaining circuit for solenoid 70, permitting the operator to release push button PB, the circuit being as follows: from $L_2$ through conductor 71, coil 70, conductor 75, a normally closed switch $S_2$, conductor 76, switch $S_3$, conductor 77, switch $S_1$, and conductors 72 and 67 to $L_1$. As long as this maintaining circuit is closed, switch $S_1$ is closed to keep motor 20 running, so as to keep the various conveyors also in operation. It will have been noted that the maintenance of the last identified circuit depends on the continued closure of switch $S_3$ which has heretofore been discussed in connection with lever 58 and its down-turned leg 65.

The rug-release mechanism will have arcuate track 34 in its normal, lowermost position, and in this position rugs 39 and 40 will be stripped without further attention at the unloading zone. Now a long rug or strip comes along, such a strip being shown at 43 in Fig. 3. When the first strip-carrying pole arrives at the arcuate track, this pole is rotated counter-clockwise, Fig. 2, or clockwise, Fig. 1, releasing the leading end of the rug. The next pole, 30a, carrying the trailing end should be rotated clockwise (Fig. 2) on account of the reverse looping of said end over the pole, but for some reason, the operator fails to actuate valve operating slide 44a, the arcuate track remains in its lower position, and the counter-clockwise rotation of this pole, as well shown in Fig. 2, begins to wind the strip around the rug-carrying pole. A depending portion of the strip has already made contact with the carding cloth strip 53a on stripper bar 53, and tension is immediately applied on the portion between the pole and the stripper bar. Since the pole is in direct drive because its sprocket wheel 35 is in mesh with pins 37, the tension begins to apply a turning moment to stripper bar 53 which, as previously indicated, is rotatable.

Referring again to Figs. 1 and 2, when lever 58 swings upwardly from its idle contact with stop 59, its leading or upper edge makes contact with roller 66 which opens switch contacts of the switch $S_3$ and breaks the maintaining circuit just mentioned above. The motor 20 stops, and all conveyors likewise stop. The cessation of operation of these conveyors is immediately apparent to anyone in the drying room, and an operator will discover the undesirable situation and will correct it without injury to the rug or to the mechanism.

Even with the current interrupted to motor 20, the inertia of the system causes some coasting, which might be enough to carry the lever 58 up close to, or into contact with, upper stop 62 if the carding cloth strip completely encircled the stripper bar. Any further movement would then be resisted by the carding cloth, with consequent scraping of the rug backing. To avoid this trouble, the carding cloth strip 53a is placed on only a limited segment of the circumference, facing generally toward the loading end of the conveyor when the stripper bar is in normal position, Fig. 1. In addition, the spring 60 is so positioned that it will go over center, as heretofore explained, causing the centerline to cross the axis of shaft 56. This occurs just before the bottom edge of the carding cloth strip 53a is about to pass out of contact with the rug. The spring then snaps lever 58 up against stop 62 thereby turning the stripper bar far enough to take the carding cloth out of contact with the rug. This is accomplished without trouble because the rotation of the stripper bar under spring tension is in the natural direction to withdraw the carding cloth pins from the rug.

It may be noted that while the lower edge of the carding cloth strip appears to be almost out of contact with the rug in the position of Fig. 2, the rug is not moving vertically in the zone of contact but has a directional movement inclined laterally and increasingly to the left as the pole sprocket travels, so that the contact is maintained until the lever has moved spring 60 overcenter. In the commercial embodiment, of which the significant elements are here shown, the stripper bar is a metal pipe. Carding cloth is available in several types, the one here used having a heavy canvas backing with bent wire points uniformly distributed and penetrating therethrough. Likewise, any suitable means could be used for fastening it upon the pipe, such as screws. Here a metal edge piece 80 is used, along with spaced narrow bands or pipe clamps 81.

Only a momentary opening of switch $S_3$ is necessary to break the maintaining circuit and stop the motor, but the arcuate leg 65 on lever 61 acts as a further safeguard in maintaining switch $S_3$ in open position. If then the push button PB is operated to start the motor, the motor will momentarily start, but will stop immediately when the finger is removed because switch $S_3$, in the maintaining circuit, is held open by lever leg 65. A careless or unskilled operator, or another workman in the vicinity who did not fully understand the nature of the stoppage, might momentarily depress the starting button and, in the absence of the safety feature embodied in leg 65, the rug or machine could be badly damaged. In our present invention, once the motor has been stopped by the opening of switch $S_3$, the trouble must be alleviated by release of the rug and return of the lever 58 to normal position before the electrical circuits operate normally. Said return of the lever must be achieved by intentional manual effort by the operator since it is held in the upper motor-stopping position by tension of the overcenter spring 60.

It may have been noted that lever 58 in the idle position of Fig. 1 is arcuately displaced downwardly approximately twenty degrees from the point of first contact with the roller finger of switch $S_3$, for the following reason. In the normal rug stripping operation, where no trouble is encountered, there still is a minor amount of torque applied to the rug-stripping bar, so that lever 58 will move upwardly a small arcuate distance above stop 59 before the rug is stripped from the carrying pole, whereupon spring tension immediately returns lever 58 to contact with stop 59. The roller of switch $S_3$ is therefore spaceed upwardly sufficiently to prevent breaking of the maintaining circuit in normal operation.

What we claim is:

1. A rug-drying apparatus including, in combination, carrier means for supporting a laundered rug, a conveyor for moving said carrier means past an unloading point, a motor for driving said conveyor, electric circuit means for energizing said motor, circuit-interrupting means for stopping current flow in said circuit, rug stripper means adjacent said unloading point disposed to intercept said rug and facilitate its removal from said carrier means, and means sensitive to tension on said stripper means responsive to continued presence of said rug on said carrier beyond said delivery point and effective on said circuit-interrupting means to stop current flow in said circuit and thereupon stop said motor.

2. A rug-drying apparatus including, in combination, a rug carrier, a conveyor for advancing said rug carrier, conveyor-moving means, a rug stripper rotatable on a longitudinal axis near said conveyor at a delivery point, rug-gripping means disposed off-axis on said stripper and adapted to intercept a portion of a rug travelling on said conveyor whereby torque is applied to rotate said stripper, and means responsive to abnormal rotation of said stripper and effective on said conveyor-moving means for de-energizing said conveyor moving means upon abnormal rotation as aforesaid.

3. A rug-drying apparatus of the character defined in claim 2 wherein yieldable means is provided for resisting rotation of said stripper.

4. A rug-drying apparatus of the character defined in claim 2 wherein biasing means is provided to resist a first increment of rotation of said stripper, but to facilitate a second increment of rotation of said stripper.

5. A rug-drying apparatus as defined in claim 4 wherein the biasing means is of the over-center snap-action character.

6. A rug-drying apparatus as defined in claim 4 wherein the biasing means is a tension spring.

7. In a rug-drying apparatus wherein conveyor means is provided for moving a rug-carrying pole past an unloading zone, power means for moving said conveyor, means for releasing said rug when said pole is rotated, means for rotating said pole, elongated rug-stripping means disposed transversely to the path of movement of said rug adjacent to said unloading zone, said rug-stripping means being adapted to engage and hold a part of said rug during rug-releasing rotation of said pole, and power cut-off means operatively responsive to movement of said rug-stripping means and effective on said power means whereby to cut off the power when abnormal tension is applied to the rug portion between said pole and said stripping bar as a result of failure of said pole to release said rug.

8. In a rug-drying apparatus wherein conveyor means is provided for moving a rug-carrying pole past an unloading zone, power means for moving said conveyor, means on said pole for retaining a rug in suspended position with its upper edge wrapped across and partially around said pole whereby said rug can drop by gravity when said pole is rotated in one direction, means at said unloading zone for rotating said pole in said direction, elongated rug-stripping means disposed transversely to the path of movement of said rug adjacent to said unloading zone, said rug-stripping means being adapted to engage and hold a part of said rug during rug-releasing rotation of said pole, and power cut-off means operatively responsive to movement of said rug-stripping means and effective on said power means whereby to cut off the power when abnormal tension is applied to the rug portion between said pole and said stripping bar as a result of failure of said pole to release said rug.

9. Safety control means for a rug-drying system of the type wherein a rug carrier having a rug thereon is advanced on a conveyor past an unloading zone, and wherein power means is provided for energizing said conveyor, said safety control means including an elongated rug stripper disposed transversely of the path of movement of said rug through said unloading zone, said rug stripper having rug gripping means on its surface, said rug stripper being adapted to engage and hold a part of said rug whereby to facilitate withdrawal of said rug from said carrier, means permitting movement of said stripper responsive to tension on said rug whenever said rug fails to be normally withdrawn from said carrier, and means responsive to abnormal movement of said stripper and effective on said power means to terminate power application thereof to said conveyor whenever said stripper moves subject to abnormal rug tension.

10. Safety control means for a rug-drying system of the type wherein a rug carrier having a rug thereon is advanced on a conveyor past an unloading zone, and wherein power means is provided for energizing said conveyor, said safety control means including an elongated rug stripper disposed transversely of the path of movement of said rug through said unloading zone, said rug stripper having uni-directional rug gripping means on its surface, said rug stripper being adapted to engage and hold a part of said rug whereby to facilitate withdrawal of said rug from said carrier, means permitting movement of said stripper responsive to tension on said rug whenever said rug fails to be normally withdrawn from said carrier, and means responsive to abnormal movement of said stripper and effective on said power means to terminate power application thereof to said conveyor whenever said stripper moves subject to abnormal rug tension.

11. Safety control means for a rug-drying system of the type wherein a rug carrier having a rug thereon is advanced on a conveyor past an unloading zone, and wherein power means is provided for energizing said conveyor, said safety control means including an elongated rug stripper disposed transversely of the path of movement of the rug through said unloading zone, said rug stripper having rug-gripping means on its surface and being adapted to engage and apply drag to a part of said rug whereby to facilitate withdrawal of said rug from said carrier, means permitting rotary movement of said stripper whenever tension is applied on the portion of said rug between said stripper and said carrier, and means responsive to rotary movement of said stripper and effective on said power means to terminate power application thereof to said conveyor whenever said stripper is rotated as aforesaid.

12. Safety control means for a rug-drying system of the type wherein a rug carrier having a rug thereon is advanced on a conveyor past an unloading zone, and wherein power means is provided for energizing said conveyor, said safety control means including an elongated rug stripper disposed transversely of the path of movement of the rug through said unloading zone, said rug stripper having rug gripping means on its surface, said rug stripper being adapted to engage and apply drag to a part of said rug whereby to facilitate withdrawal of said rug from said carrier, means permitting normal rotary movement of said stripper responsive to tension applied to the portion of said rug between said stripper and said carrier, and further permitting abnormal rotary movement of said stripper whenever said rug fails to be normally withdrawn from said carrier, and means responsive to such abnormal rotary movement of said stripper and effective on said power means to terminate power application thereof to said conveyor whenever said stripper is subjected to said abnormal rotary movement.

13. Safety control means for a rug-drying system of the type wherein a rug carrier having a rug thereon is advanced on a conveyor past an unloading zone, and wherein power means including an electric circuit is provided for energizing said conveyor, said safety control means including an elongated rug stripper disposed transversely of the path of movement of the rug through said unloading zone, and being rotatable around a longitudinal axis, said rug stripper having rug-gripping means on its surface and being adapted to engage and apply drag to a part of said rug whereby to facilitate withdrawal of said rug from said carrier, a switch in said circuit, a switch operator on said stripper disposed to rotate to contact with said switch whenever abnormal tension is applied to the portion of said rug between said stripper and said carrier by reason of failure of said rug to be normally withdrawn from said carrier, operation of said switch being effective to break said electric circuit and stop said conveyor.

14. Safety control means as defined in claim 13 wherein said switch operator is normally spaced from said switch a distance sufficient to permit a preliminary increment of movement before contacting said switch.

15. Safety control means as defined in claim 13 where in said switch operator is provided with an elongated extension adapted to maintain contact with said switch during a material segment of stripper rotation whereby to prevent re-closing of said power circuit while said stripper is in a condition of abnormal rotation.

16. Safety control means as defined in claim 13 wherein said switch operator consists of an arm fixed to and extending radially away from said stripper whereby to be rotatable with said stripper.

17. Safety control means as defined in claim 16 wherein said arm is provided with spring biasing means opposing an initial increment of rotation of said arm and stripper but expediting a final increment of rotation of said arm and said stripper.

References Cited in the file of this patent

UNITED STATES PATENTS 2,371,140   Alling et al. _____ Mar. 13, 1945